(12) United States Patent
Joosen et al.

(10) Patent No.: US 10,794,668 B2
(45) Date of Patent: Oct. 6, 2020

(54) LIGHTING CONTROL

(71) Applicant: SIGNIFY HOLDING B.V., Eindhoven (NL)

(72) Inventors: Bram Francois Joosen, Breda (NL); Martijn Marius Hultermans, Eindhoven (NL); Edith Danielle Den Hartog, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/615,809

(22) PCT Filed: May 22, 2018

(86) PCT No.: PCT/EP2018/063369
§ 371 (c)(1),
(2) Date: Nov. 21, 2019

(87) PCT Pub. No.: WO2018/219716
PCT Pub. Date: Dec. 6, 2018

(65) Prior Publication Data
US 2020/0096298 A1 Mar. 26, 2020

(30) Foreign Application Priority Data
May 30, 2017 (EP) ..................................... 17173393

(51) Int. Cl.
*F21V 21/26* (2006.01)
*H05B 47/11* (2020.01)
(Continued)

(52) U.S. Cl.
CPC ............ *F41H 13/0087* (2013.01); *F21S 8/04* (2013.01); *F21V 21/26* (2013.01); *H05B 47/11* (2020.01);
(Continued)

(58) Field of Classification Search
CPC ........ H05B 45/00; H05B 47/00; H05B 47/11; H05B 47/12; F21S 8/04; F21V 21/26;
(Continued)

(56) References Cited

U.S. PATENT DOCUMENTS

| 3,732,412 A | 5/1973 | Tyroler |
| 7,209,958 B2 * | 4/2007 | Crookham ............. G06Q 30/02 709/217 |

(Continued)

FOREIGN PATENT DOCUMENTS

| EP | 0814344 A2 | 12/1997 |
| EP | 3010223 A1 | 4/2016 |
| WO | 2016156462 A1 | 10/2016 |

OTHER PUBLICATIONS

Lighting Research Center, vol. 9, Issue 1 (Apr. 2011) "A Method for Estimating Discomfort Glare from Exterior Lighting Systems", vol. 9, Issue 1, Apr. 2011;http://www.lrc.rpi.edu/programs/solidstate/assist/pdf/AR-DiscomfortGlare.pdf.

*Primary Examiner* — Jimmy T Vu
(74) *Attorney, Agent, or Firm* — Daniel J. Piotrowski

(57) ABSTRACT

A method of controlling at least one light source to discourage unwanted behavior at a spectator event comprising a plurality of spectator areas, the method comprising: detecting, based on sensor input received from a sensor at the spectator event, at least one spectator exhibiting unwanted behavior within a first one of the spectator areas; determining a location of the first spectator area; identifying a second one of the spectator areas as being a target of the unwanted behavior and determining a location of the second spectator area; and controlling at least one light source based on the determined locations to increase an amount of glare along at least one line of sight between the first and second spectator (Continued)

areas and thereby discourage the spectator from looking towards the second spectator area to discourage the unwanted behavior.

15 Claims, 6 Drawing Sheets

(51) Int. Cl.
    *F41H 13/00*     (2006.01)
    *H05B 47/12*     (2020.01)
    *F21S 8/04*     (2006.01)
    *F21W 131/406*     (2006.01)
    *F21W 131/407*     (2006.01)

(52) U.S. Cl.
    CPC ....... *H05B 47/12* (2020.01); *F21W 2131/406* (2013.01); *F21W 2131/407* (2013.01)

(58) Field of Classification Search
    CPC ....... F21W 2131/406; F21W 2131/407; F41H 13/0087
    See application file for complete search history.

(56) References Cited

U.S. PATENT DOCUMENTS

| | | |
|---|---|---|
| 8,125,349 B2 | 2/2012 | May |
| 8,952,628 B1 | 2/2015 | Gordon et al. |
| 2008/0002395 A1 | 1/2008 | Eisenberg et al. |
| 2008/0013311 A1 | 1/2008 | Rubtsov |
| 2010/0092031 A1 | 4/2010 | Bergeron et al. |
| 2012/0206050 A1* | 8/2012 | Spero ............ H05B 3/008 315/152 |
| 2013/0279757 A1 | 10/2013 | Kephart |
| 2015/0061502 A1 | 3/2015 | Rains et al. |
| 2017/0027035 A1 | 1/2017 | McDermott |

* cited by examiner

LIGHTING CONTROL

CROSS-REFERENCE TO PRIOR APPLICATIONS

This application is the U.S. National Phase application under 35 U.S.C. § 371 of International Application No. PCT/EP2018/063360, filed on May 22, 2018, which claims the benefit of European Patent Application No. 17173393.4, filed on May 30, 2017. These applications are hereby incorporated by reference herein.

TECHNICAL FIELD

The present disclosure relates to control of lighting and particularly but not exclusively, to control of lighting to modify behavior in venues such as stadiums, arenas and the like.

BACKGROUND

Crowds of spectators in stadiums, arenas, concert halls and the like create an exciting atmosphere and generate large revenues through ticket sales, e.g. at a soccer/football match where the supporters contribute to the overall experience. Their singing and cheering not only contributes to the atmosphere in the stadium/arena, but can even be experienced by a remote viewer such as a person at home or other public place watching the event on a screen (either live or later).

Unfortunately however, unwanted behavior such as chanting of an offensive or upsetting nature can occur. This negatively impacts not only those people who are offended, but also other supporters/spectators, organizers, clubs, and venue owners involved. In the example of a football match, such undesirable crowd behavior could lead to fines for the clubs involved, sanctions such as matches being played without supporters, damage to reputation of a club or organizer and loss of sponsorship. In extreme cases, such unwanted behavior can potentially lead to violence, and is therefore a safety and security consideration.

SUMMARY

As mentioned above, the atmosphere at an event can be influenced by the behavior of the people in attendance. Unfortunately, this is not always positive. That is, in some cases, the atmosphere can be negatively impacted by fans/hooligans producing (for example) unwanted chants, unwanted gestures, or other unwanted behaviors. The present invention recognizes that these chants/gestures etc. can often be directed towards another person or groups of people at the event (e.g. the away team). This behavior in particular can cause issues during and/or after the match; it can heavily influence the image of the performers (e.g. the team or teams playing a football match, the singer or band playing a music concert etc.); it can lead to fines; and can escalate outside the venue later on.

Hence, it would be desirable to be able to deter such aggressive behaviors between fans, such that the situation between them is less likely to escalate.

Described embodiments of the present invention create glare on purpose based on location of a first group of spectators exhibiting a detected behavior, wherein the direction in which this group experiences glare is determined by the position of at least one other group of spectators. As such, the lamps (light sources) can be used and the direction in which light is emitted by these lamps is controlled.

According to a first aspect of the invention there is provided a method of controlling at least one light source to discourage unwanted behavior at a spectator event comprising a plurality of spectator areas, the method comprising: detecting, based on sensor input received from a sensor at the spectator event, at least one spectator exhibiting unwanted behavior within a first one of the spectator areas; determining a location of a first spectator area; identifying a second one of the spectator areas as being a target of the unwanted behavior and determining a location of the second spectator area; and controlling at least one light source based on the determined locations to increase an amount of glare along at least one line of sight between the first and second spectator areas and thereby discourage the spectator from looking towards the second spectator area to discourage the unwanted behavior.

In embodiments, the at least one light source comprises fixed optics for generating glare and said increasing the amount of glare comprises activating the at least one light source.

In embodiments, the at least one light source comprises variable optics and said increasing the amount of glare comprises controlling the optics of the at least one light source such that the amount of glare increases.

In embodiments, the at least one light source is controlled to increase the amount of glare along the line of sight from a deBoer rating of more than five to a deBoer rating of five or less.

In embodiments, increasing the amount of glare comprises increasing an amount of discomfort glare along the line of sight.

In embodiments, increasing the amount of glare comprises increasing an amount of disability glare along the line of sight.

In embodiments, the method further comprises receiving sensor input from at least one photosensor and determine, based on the sensor input, a background light level; and wherein the at least one light source is controlled to increase the amount of glare based on the determined background light level.

In embodiments, the at least one light source is at least one spotlight.

In embodiments, the at least one light source is at least one pivotable light source; and the method further comprising pivoting the light source to illuminate the spectator.

In embodiments, the at least one light source is at least one moveable light source; and the method further comprising moving the light source to illuminate the spectator.

In embodiments, the at least one light source is selected from a plurality of light sources based on the determined locations.

In embodiments, the at least one light source is controlled to change a direction of light emission based on the determined locations.

According to a second aspect disclosed herein, there is provided a controller of a lighting system for discouraging unwanted behavior at a spectator event comprising a plurality of spectator areas, the controller comprising at least one processor configured to carry out the method of the first aspect or any embodiment thereof.

According to a third aspect disclosed herein, there is provided a lighting control system for discouraging unwanted behavior at a spectator event comprising a plurality of spectator areas, the lighting control system comprising: at least one light source; at least one sensor at the spectator event; and a controller configured to: detect, based on sensor input received from the at least one sensor, at least one spectator exhibiting unwanted behavior within a first one of the spectator areas; determine a location of the first spectator area; identify a second one of the spectator areas as being a target of the unwanted behavior and determine a location of the second spectator area; and control the at least one light source based on the determined locations to increase an amount of glare along at least one line of sight between the first and second spectator areas and thereby discourage the spectator from looking towards the second spectator area to discourage the unwanted behavior.

According to a fourth aspect disclosed herein, there is provided a computer program product comprising computer-executable code embodied on a computer-readable storage medium configured, so as when executed by at least one processor, to perform the steps of the method according to the first aspect or any embodiment thereof.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION

Events suffer when spectators exhibit bad behavior. For example, football clubs suffer when hooligans start singing opposing lyrics. Typically, it may be just a handful of hooligans that spoil the atmosphere for many others. When hooligans start with these unwanted chants, in certain cases other fans/hooligans (e.g. of an opposing club) react when feeling put down by the other fans. Sports clubs in particular may benefit from means to control the spreading effect of unwanted chants/gestures. Fans/hooligans producing insulting chants and unwanted gestures between rival supporter groups can cause issued during and after the match; it can heavily influence the image of the club, lead to high fines, and can further escalate outside the sports venue. The present invention aims to help e.g. to influence the behavior of people who produce such bad behaviors like insulting chants or gestures.

The described system uses real-time data to create glare so as to create an unpleasant lighting sensation for people who show unwanted behavior in a public venue.

The system comprises:

a sound detection system which is able to recognize sounds and detect/analyses where specific sounds are coming from;

smart sensors, e.g. a camera that is able to detect and focus on detected people;

dynamic lighting system which can use the output of third part data to act upon.

Usually the unwanted chants come from fanatic hooligans who are seated in a particular area in the stadium/arena. The lamps could e.g. hand above an "opponent supporter's area" orientated at the fanatic fan section, attached to the stadium's and or arena's ceiling above the seating area (as in FIG. 3—see below).

The system will then create discomfort for the chanting fan(s), through lighting intensity and beam direction, when they are trying to make eye contact to observe their impact with the fans from the opposition.

That is, the system creates glare on purpose based on location of a first group of spectators exhibiting a detected behavior, wherein the direction in which this group experiences glare is determined by the position of at least one other group of spectators. Lamp(s) to use in creating the glare and/or the direction in which light is emitted by these lamps is controlled based on the locations of both the spectators exhibiting the unwanted behavior and the location of the other group(s) of spectators towards which the behavior is inferred to be directed.

Figure 1:
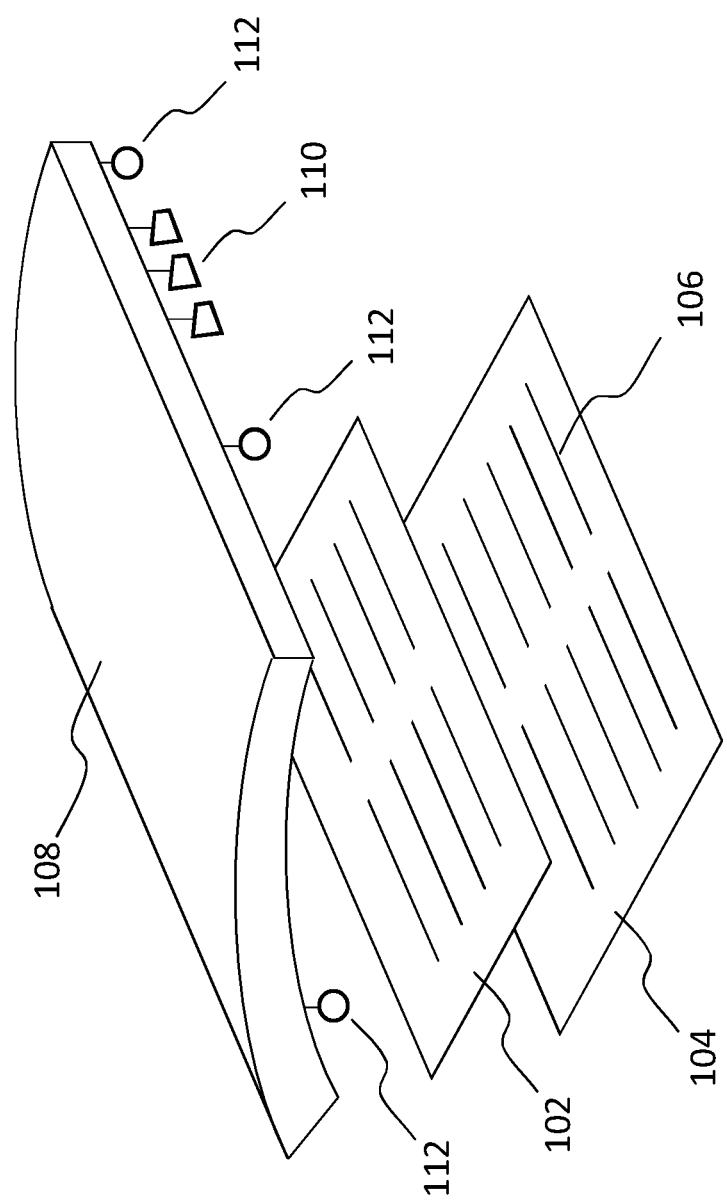
FIG. 1 shows a section of a stadium employing a lighting control system.

FIG. 1 illustrates a region of a stadium, including an upper stand 102 and a lower stand 104. This region may be referred to as a "spectator area" in the sense that it is a region within the stadium in which spectators may be situation (e.g. sitting or standing). However, the term "spectator area" refers more generally to any area within the stadium of any size and does not necessarily align exactly or at all with the divisions between the stands. The space within the stadium (described in more detail later) may, as a whole, be referred to as the event area. Seating in the stands is designated by lines 106. A roof section 108 is provided above the stands. A light, or lighting array 110 is directed towards the stands for providing illumination or lighting effects to a desired area or location of the stands. Microphones 112 are provided for detecting sound originating from the stands.

Lighting 110 and microphones 112 are shown suspended from the roof section 108, but could alternatively or additionally be located on another structure such as a lighting gantry, or at ground level for example.

Particular areas or portions of the stadium may be designated for monitoring. The region to be monitored may be a particular section or tier of a stand such as those illustrated. All of the spectator areas of the stadium can be monitored, or only designated portions, such as the away team's supporters, or regions where home and away team supporters are in proximity. In some cases, specific seat numbers or rows may be monitored. Each designated portion preferably has its own lighting 110 and sound monitoring 112 capabilities, which can be operated and controlled independently.

Figure 2:
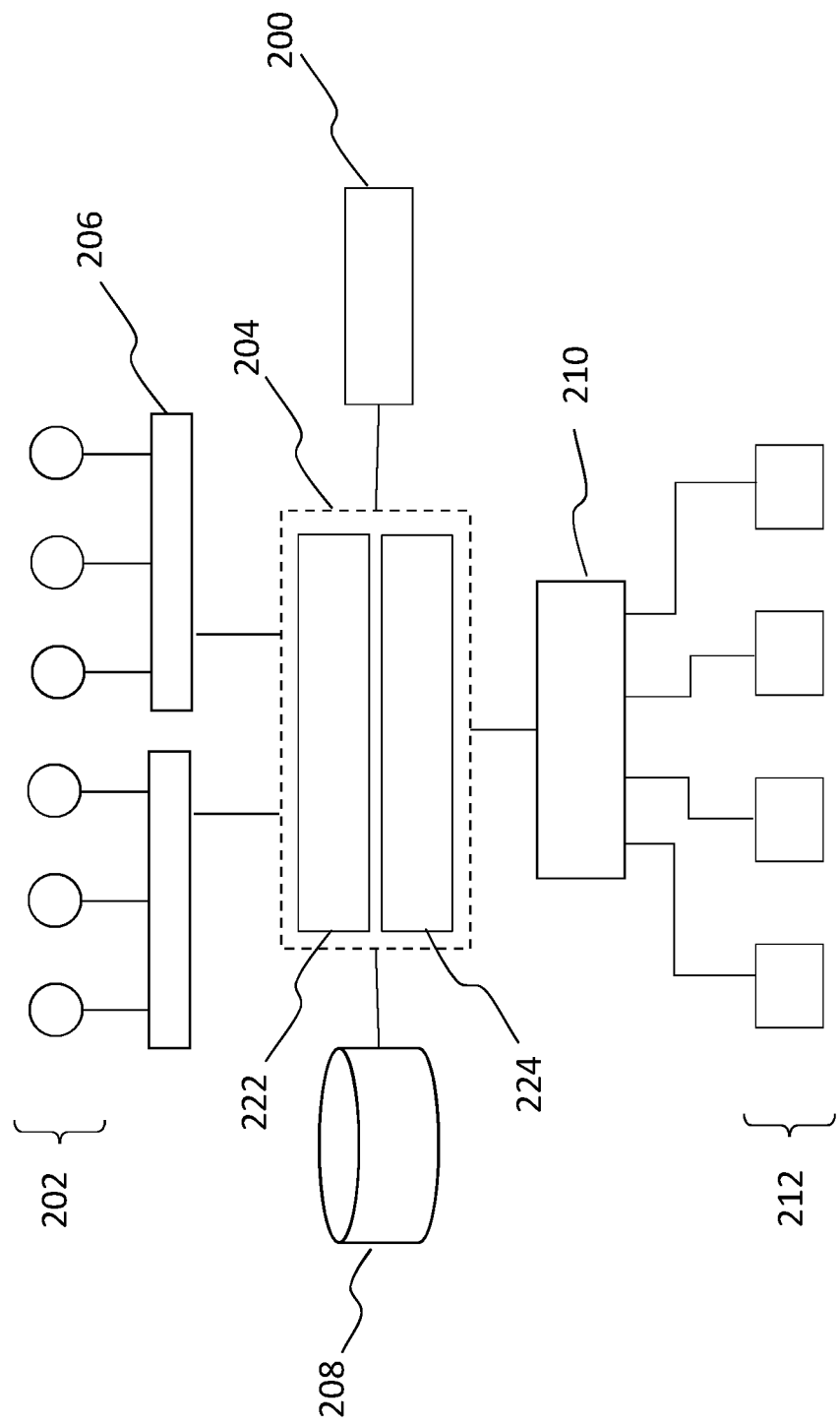
FIG. 2 is a schematic illustration of a lighting control system.

FIG. 2 shows a schematic arrangement of a lighting control system, including sound transducers 202 for converting sound input to audio signals provided to processor 204. Typically microphones are used as sound transducers. Six microphones in two groups of three are shown for the sake of illustration, but ten or more or 100 or more microphones may be provided. Microphones may be provided in an array, or multiple arrays, and provide the function of an 'acoustic camera' in embodiments. The microphone outputs may be provided directly to processor 204, or may be provided via an intermediate processor 206 for performing pre-processing. Microphones 202 may be connected to processor 204 by wired connection, or wirelessly. Where an intermediate processor 206 is included, it may be connected to microphones by wired connection, and be connected to processor 206 wirelessly. Processor 204 functions as a controller. In general, a controller can be formed of one or more processors (e.g. CPU/CPUs), in localized or distributed fashion, configured to carry out the operations disclosed herein.

Processor 204 includes a sound recognition module 222 capable of analyzing detected sound and recognizing specific sounds or patterns of sound, and a source localization module 224 capable of determining the location of the source of a particular sound, based upon the signals from the transducers 202.

The sound recognition module analyses detected sounds to look for certain audible behavior, such as offensive chants. Particular words or phrases may be recognized, by performing speech recognition, but recognition may be based on other distinguishing audio characteristics and patterns such as intonation, tone, syntax and rhythm.

Typically recognition is performed using algorithms running on a processor or processors using techniques such as statistical modelling, acoustic modelling and language modelling, which are known in the art. Reference or training data may be used, such as key words or phrases, or unwanted chants and other target sounds previously recorded, and such data may be stored on memory or server 208 for example. Memory or server 208 may be connected to the processor via a network such as the internet.

It will be appreciated that commonly in an environment such as a sports stadium or ground is a noisy environment, and that a mixture of audio signals will be present from multiple sources. Therefore some filtering or signal separation may be performed to isolate sounds from different sources, to assist recognition. Signal separation techniques, such as blind signal separation are known in the art, as are many noise reduction techniques.

Localization of the source of recognized sounds is preferably performed based on the sound information captured by the microphone or microphone array 202. The sound information may first undergo pre-processing such as noise reduction, by intermediate processor 206 for example. Additionally or alternatively, the sound information may undergo processing by or in combination with the sound recognition module 222. For example, the output of the sound recognition module could be used to filter the input of the source localization module, even if the two modules use audio data from different microphones or microphone arrays. Localization of a sound source may performed based on time difference of arrival (TDOA) effectively using triangulation of a signal received at two or more microphones separated by a known distance. Cross-correlation may also be used to determine the position of a sound source received at two or more microphones.

Localization may provide a distance and direction from a microphone or microphone array receiving the sound, to specify the location in three dimensions. Alternatively only a direction may be provided, e.g. azimuth and elevation angles, relative to a reference point, which may be the location of a microphone, or a central reference for a group of microphones, or a microphone array. In an environment such as a sports stadium, the distance or range can be found by considering the layout of the stadium (e.g. the position of the spectator stands). However, as will be explained below, a direction without a distance may be sufficient in embodiments of the invention.

The localization may be sufficiently accurate to identify a single individual as the source of a sound, i.e. an accuracy of approximately 1 m or less. Alternatively, it may be sufficient to identify a small group of individuals, i.e. an accuracy of approximately 2 m or less, or approximately 5 m or less for example.

Sound recognition and source localization may be performed based on the same audio data i.e. data from the same microphone(s), or each function may use a separate microphone or set of microphones capturing the same sound or sounds, but having different characteristics or located at different positions for example.

In embodiments the processor 204 can monitor the development of a particular sound, such as a chant, over time. For example a chant may begin with a single individual, but may spread, to an increasing number of individuals. The system can advantageously recognize the evolution of the sound, and determine the spread of its source. Conversely, if only data sufficient to determine the location as corresponding to a group of individuals can be obtained, an individual at the center of the group may be identified as the possible initiator of unwanted behavior such as chanting.

A camera 200 may optionally be provided, to capture images and/or video of the determined location of sources of target sounds. For example, if offensive or upsetting chanting is recognized, video can be captured of the person or persons responsible. The pan and tilt of the camera can be controlled according to the output of the source localization. Focus may also be controlled based on the localization, or may be automatic. The term "sensor" is used herein to refer generally to any device capable of detecting parameter values (e.g. light levels, sound levels etc.) within the stadium and hence can refer to either the microphones 202 or the camera 200.

One or more light sources 212 (luminaires) are provided in the vicinity of the area to be monitored, such as a section of a sports stadium. The luminaires are capable of providing illumination and lighting effects in the event area. The luminaires, under the control of a lighting controller 210, are able to provide specific light output to specifically designated positions or areas of an area being monitored. This is typically by use of one or more luminaires having adjustable pan and tilt axes for steering a directional beam of light. A light source may be mounted on a driven yoke for example, or a twin axis double mirror arrangement could be employed. Alternatively multiple light sources having fixed, or limited beam directionality may be used, and the direction of illumination may be controlled by selective switching of different light sources.

Different types of luminaires may be used in combination, and may be grouped together for the purposes of control. Examples of possible luminaires or light sources include spot lights, strobe lights, and laser sources. In the case of a laser, safety should be an important consideration, and therefore preferably a harmless laser classified as class 1, class 1M, class 2, or class 2M should be employed.

The lighting controller 210 can control the output of the luminaires 212 based on information provided from processor 204. The output can be based on the determined location of the sound source, and also the nature or classification of the sound, and optionally user input provided via a user interface (not shown). The control output can by be dynamic, varying in response to changes in the nature and/or location of the sound being monitored. The output is typically controlled to expose a point or area determined by the source localization 224 to adverse lighting effects. Thus in addition to the direction, the controller can control the pattern of light, controlling parameters such as the intensity, modulation and frequency of light. Direction may be controlled by individual values of pan and tilt for example, however the pattern of light output may be based on pre-set parameter values corresponding to one or more known effects, such as a flashing pattern or a dazzling illumination pattern.

Luminaires may be connected to the lighting controller 210 by wired connection, or wirelessly. Multiple groups of luminaires may be provided, and each group may have a separate lighting controller.

Figure 3:
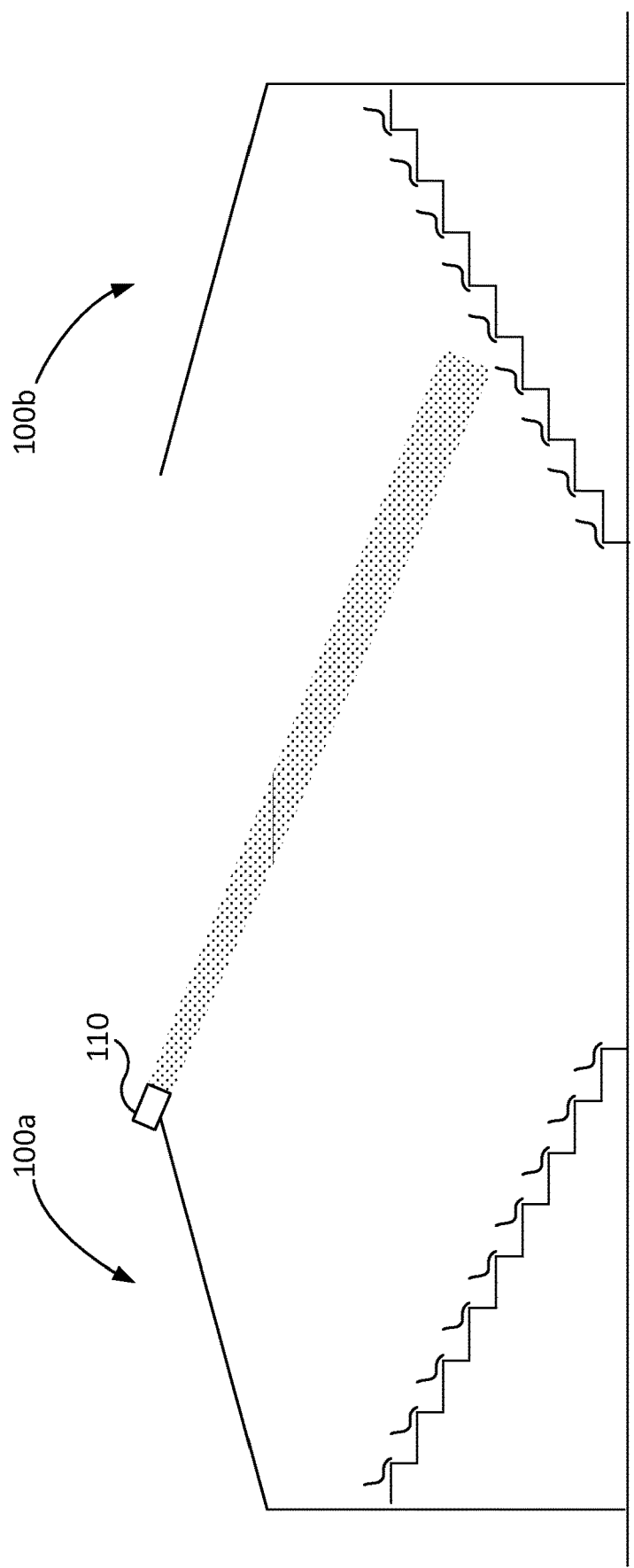
FIG. 3 shows the use of a spotlight when there are two sections of a stadium comprising fans of different teams.

FIG. 3 shows a cross-view of a stadium comprising two spectator regions (stands) 100a, 100b. The spectators for the event (e.g. a football match taking place on a pitch between the two stands 100a, 100b) may be segregated wherein spectators supporting one team are seating in one stand and spectators supporting the other team are in the other stand. In FIG. 3, stand 100b contains "home" supporters and stand 100a contains "away" supporters, though it is appreciated that the segregation may not be on a per-stand basis (i.e. sub-sections of stands and/or multiple stands may be used for different supporter affiliations). The segregation may or may not be contiguous.

A single light source 110 (here, a spotlight, though other type of light source may be used) is shown in FIG. 3 situation in the opposition stand 100a, though it is appreciated that multiple light sources may be present (see FIG. 1) and that this is only for the purposes of explanation. Specifically, there will preferably also be at least one light source situation in the home stand 100b. The light source 110 is shown mounted on the roof of the stand 100a, but may be placed anywhere within the stadium. What matters here is that the light source 110 is arranged to illuminate the home stand 100b.

Given the arrangement of the stands 100a, 100b and the spotlight 110, operating the spotlight 110 to illuminate the home stand 100b (or at least a subregion of the home stand 100b) will cause any spectator(s) within the illumination area to experience glare if the spotlight 110 is bright enough.

Figure 4:
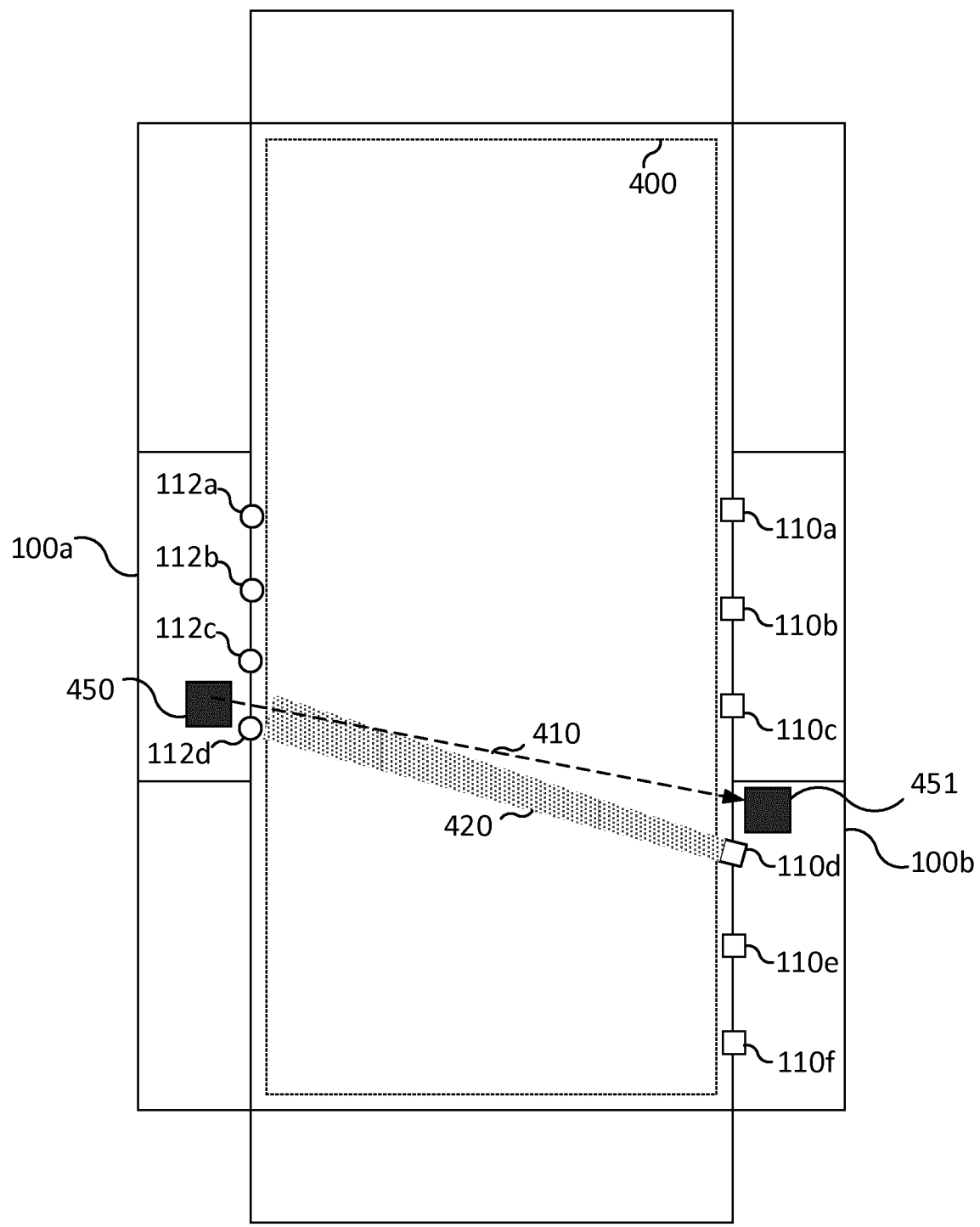
FIG. 4 illustrates a possible situation of stands within a stadium.

Following on from this, FIG. 4 shows a similar arrangement in which the opposition stand 100a and home stand 100b are shown situated within a stadium comprising six other stands surrounding the pitch 400 (or other event area).

Four microphones 112a-d are shown within the opposition stand 100a (though, again, more or fewer may be present in this and other stands, including the home stand 100b, but are not shown in the Figure for the sake of clarity), and six light sources 110a-f are shown. Three light sources 100a-c are placed within one of the stands and the other three light sources 100d-f are placed within the home stand 100b. Again, it is appreciated that more or fewer may be present than these and other stands, including the opposition stand 100a, but are not shown in the Figure for the sake of clarity).

A spectator 450 is shown located within the opposition stand 100a. Using input from the microphones (e.g. microphones 112a-d though potentially fewer or more than shown), and potentially input from one or more cameras (not shown) the processor 204 can determine this spectator 450 as exhibiting unwanted behavior, as described above. A single spectator 450 is considered here, but it is appreciated that these techniques apply equally to two or more spectators who are co-located. That is, input from the microphones (and cameras) may be used to locate a group of spectators exhibiting unwanted behavior. This is typical of a crowd in a sports event, e.g. a group of hooligans.

A line of sight 410 of this spectator (or group) can be determined by the processor 204. This can be inferred, or estimated, because e.g. usually unwanted chants come from fanatic hooligans who are seated in a particular area in the stadium/arena and are targeted towards fans of the opposing team. That is, given knowledge that stand 100b contains fans of the opposing team from stand 100a, it can be accepted that the behavior exhibited by spectator 450 is likely aimed towards stand 100b, e.g. towards home supporter(s) 451 shown in FIG. 4. Note however that it may generally be sufficient to consider the unwanted behavior to be targeted towards the opposing team as a whole.

The present invention recognizes that this unwanted behavior could escalate without interference, and therefore proposes to generate glare for the spectator(s) 450 exhibiting the unwanted behavior in a manner which discourages them from continuing, by taking away their line of sight 410 to the opposition. That is, by impeding their view of the opposition, they may be discouraged from continuing to chant/jeer towards them, as this will no longer be effective or rewarding. Hence, one (or more) light sources 110d are controlled to output illumination 420 which generates glare for the spectator(s) 450 which discourages the determined line of sight 410.

Note that, glare is generally an unwanted effect because it can be uncomfortable for a user and therefore lighting systems in the prior art aim to reduce the amount of glare. The present invention, on the other hand, specifically aims to intentionally generate glare due to the recognized advantages in de-escalating an unwanted behavior at an event (as described herein).

Figure 5:
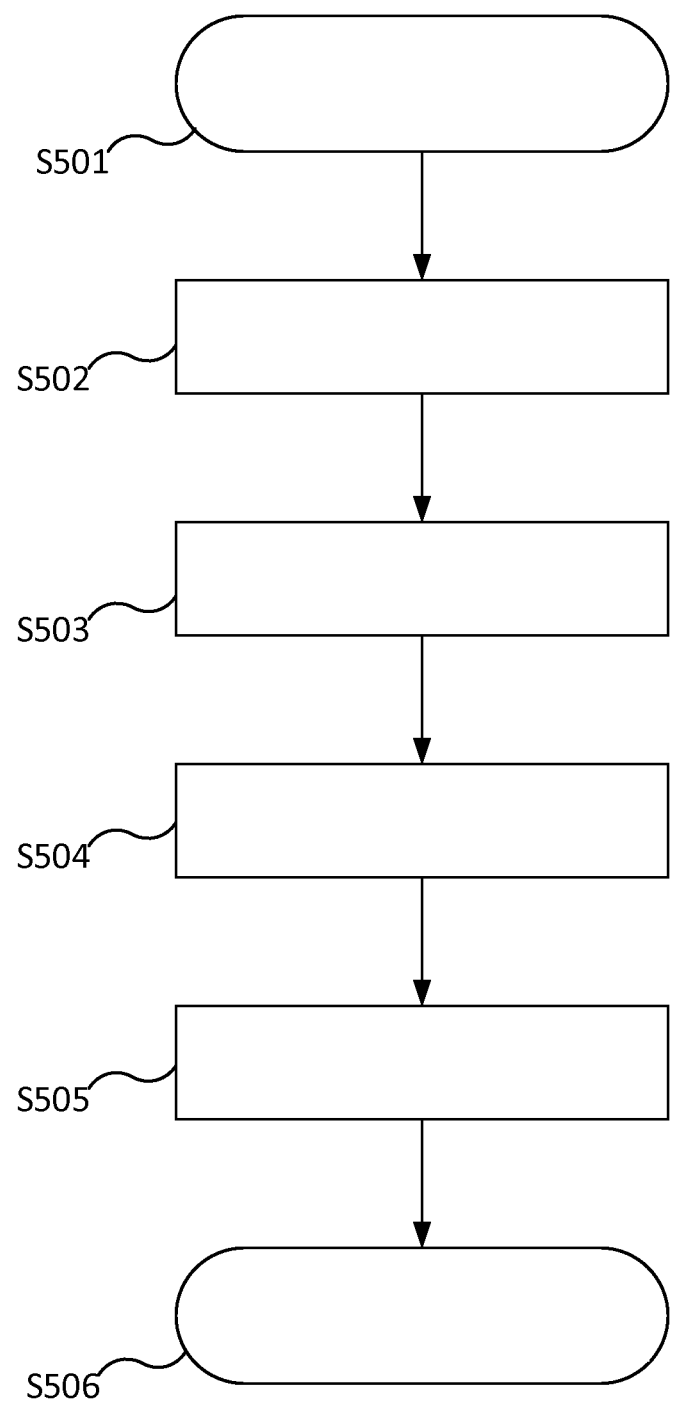
FIG. 5 is a flow diagram of a method according to embodiments of the present invention.

FIG. 5 is a flow diagram illustrating a method according to embodiments of the present invention. The method begins at step S501 wherein one or more spectators begin behaving in an undesirable manner, and comprises steps S502-S505 which are performed by the processor 204 and step S506 which is performed by the lighting controller 210 when present, or the processor 204 when a separate lighting controller 210 is not provided.

As mentioned, at step S501, a spectator 504 (or more) exhibit unwanted behavior such as shouting/jeering etc.

At step S502, the unwanted behavior is detected by the sound recognition module 222 of processor 204 using the microphones 112 using techniques described above. The unwanted behavior may alternatively be detected by the processor 204 using camera 200, or both the microphones 112 and the camera 200.

In any case, the location of the unwanted behavior is determined by the source location module 224 at step S503. Again, techniques for doing so are described above and so not repeated here.

At step S504, a target of the unwanted behavior is determined. As mentioned above, this can be estimated based on the allegiances of the spectators in the various locations of the stadium. This may comprise the processor 204 accessing a memory such as memory 208 storing a map of the stadium and the locations of supporters of different teams. For example, with reference to FIG. 4, the map may specify that region 100a contains "opposition" supporters and region 100b contains "home" supporters (note again that the spatial divisions between the groups of supporters may not coincide with the divisions between the stands in the stadium). Hence, the processor 204 can determine, using said map, that the behavior of the spectator 450 identified previously (steps S502 and S503) is likely targeted towards stand 100b (rather than one of the other stands).

The method then proceeds to step S505 in which the processor 204 determines a line of sight 410 of the spectator 450 based on the previously determined (likely) target of the behavior. In the simplest case, this line of sight 410 is determined to be a straight line running from the location of the spectator 450 (or centroid of a group of spectators) to the location of the target 451 (or centroid).

It is this line of sight 410 which is important to the spectator(s) 450 because often the unwanted behavior (e.g. chanting) is targeted to the other team's spectators in order to get a reaction. That is, the spectator's "reward" for this behavior is the (often equally unwanted) reaction from the opposing fans.

Hence, the method proceeds to step S506 in which the luminaires 110 are controlled by the lighting controller 210 to impede this determined line of sight 410. This is done using knowledge of the line of sight 410 to select one or more of the luminaires 110 (luminaire 110d in this example) which appear to the spectator 450 in the direction of the line of sight 410. That is because these luminaires 110d will be most effective at generating glare for the spectator 450.

Once of more of the light sources 110 (at least the light source 110d generating the glare) may be spotlights, i.e. luminaires with a narrow angular output range and high power. This is advantageous because a spotlight shining onto a person is more effective at generating glare than, e.g. an incandescent bulb with isotropic output. Hence, the processor 204 or lighting controller 210 may select the one or more spotlight light sources 110 to control based on which spotlight(s) lie along the spectator's line of sight and shine onto the location of the spectator 450.

To aid this, the spotlights 110 may be moveable or pivot-able such that the lighting controller 210 can alter their illumination direction. Hence, in embodiments, the determined spotlights 110 may be moved and/or pivoted in order to point towards and thus illuminate the spectator(s) 450.

As known in the art, the amount of glare a user experiences depends on a variety of factor. Knowledge of these factors is usually used to aid glare reduction, but the present invention proposes to increase glare for a specific one or more spectators 450. Hence, in embodiments, the brightness (output luminance) of the determined one or more light sources 110 is adjusted based on a background light level. The background light level is the ambient light brightness within the stadium (or, more specifically, at the location of the spectator 450) and can be determined using one or more light sensors (photosensors) known in the art such as photodiodes. That is, the processor 204 can be configured to receive sensor input from at least one photosensor and determine, based thereon, a background light level for use in controlling the at least one light source 110.

Two different types of glare are commonly distinguished—disability glare, and discomfort glare. Disability glare is a reduction in visibility when light from a bright light source scatters in a user's eye causing an apparent reduction in the luminance contrast experienced. Discomfort glare, on the other hand, is the annoying or even painful sensation experienced by the user viewing a bright light source, and is therefore more subjective than disability glare. Either type of glare may discourage spectators from a particular viewing direction, either "actively" (e.g. due to pain) or "passively" (e.g. by reducing visibility).

The deBoer rating scale is an example of a way of characterizing discomfort glare, and delineates discomfort experienced by a user on a 9-point scale from 1 (unbearable), through 3 (disturbing), 5 (just permissible), 7 (satisfactory), to 9 (just noticeable). Note: a lower deBoer rating means a greater amount of glare.

The deBoer rating gives direction on required light levels to reach the feeling of discomfort depending on the surrounding criteria like viewing angle, background luminance and source luminance. The deBoer rating can be defined by the following equation:

$$R_{deBoer} = cte + \alpha\log_{10}\left(\frac{L_g\omega}{L_b}\right) + \beta\theta$$

Where $L_g$ is the luminance of the glare source, $L_b$ is the background luminance, $\omega$ is the solid angle subtended by the glare source from the spectator's position, $\theta$ is the viewing angle, and cte, $\alpha$, $\beta$ are constants. This formula can be used to calculate the different variables required to reach a discomfort rating—e.g. a deBoer scale value below 5.

In other words, traditional lighting knowledge on what not to do and what bad optical lighting design is (e.g. using the deBoer scale, which is usually applied in scenarios in which one wishes to reduce the amount of glare) can be leveraged to purposely design optics with a high level of glare by determining parameter values which create an increased amount of glare. This can be done in two different ways, as described below.

Firstly, the light sources may be designed such that they always create glare (e.g. by being very bright). In this case, the light sources will usually be in the "off" state and are only turned on when unwanted behavior is detected. Other, non-glare-generating light sources may be present within the stadium which can provide normal lighting. The glare-generating light sources can then be used in conjunction with these by either switching between the two types or controlling the glare-generating light sources to additionally turn in response to unwanted behavior.

Secondly, the optical characteristics can be changed by changing the light distribution of a light source by controlling a lens of the light source (by changing the lens-light source interaction). This option is less preferable than the first in some respects, as it requires a moving system, but can still provide the same results. It also provides additional flexibility, which may be beneficial in certain circumstances.

Figure 6:
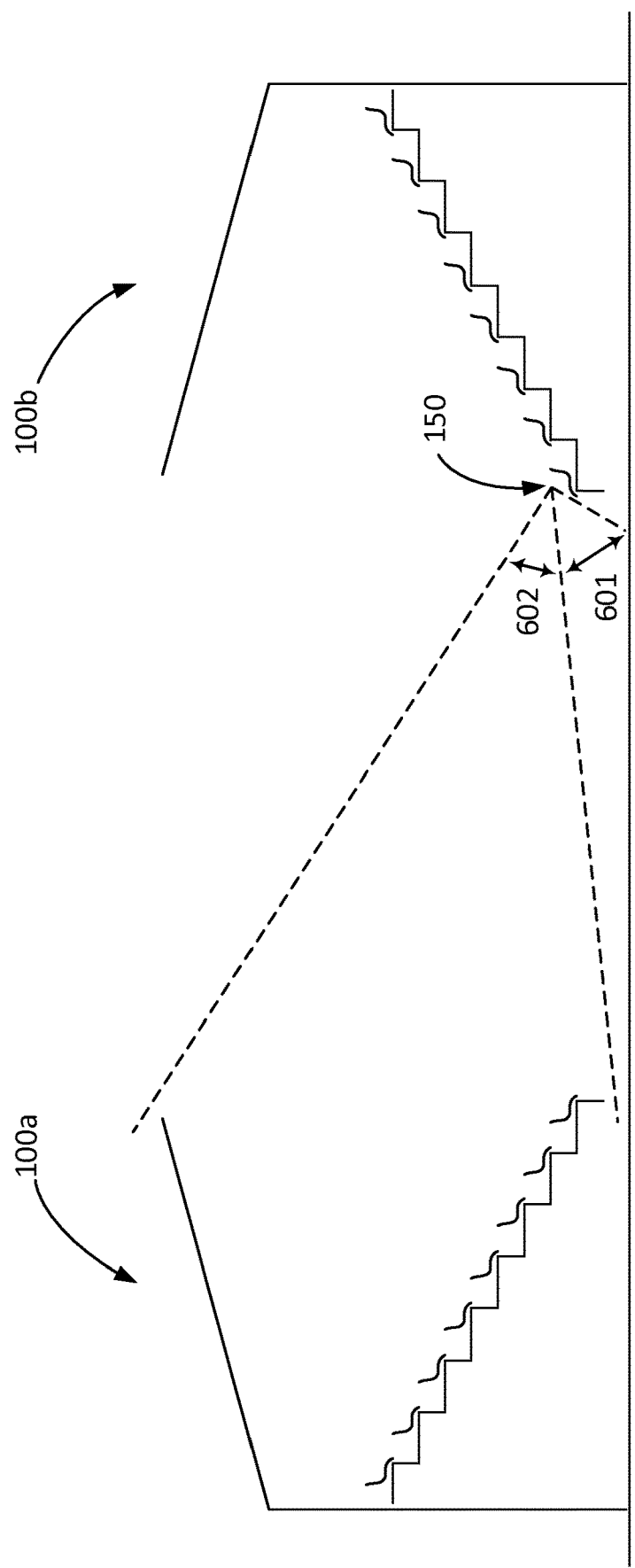
FIG. 6 shows viewing angles ranges for an exemplary spectator.

Other methodologies are possible, such as discussed in Lighting Research Center, Volume 9, Issue 1 (April 2011) "A Method for Estimating Discomfort Glare from Exterior Lighting Systems", accessible at http://www.lrc.rpi.edu/programs/solidstate/assist/pdf/AR-DiscomfortGlare.pdf FIG. 6 shows the stadium described in FIG. 3 for the purposes of more generally describing the glare generating. Again, an "away" stand 100a and a "home" stand 100b are shown either side of a football pitch (which could, as mentioned, be any other event area).

Say that a home supporter 150 is exhibiting unwanted behavior, two angular ranges (in reality these are solid angle ranges, but shown only in 2D in FIG. 6) within his field of view are of particular interest and are shown in FIG. 6. That is, his field of view comprises a first direction (range of directions) 601 towards the football pitch and a second direction (range of directions) 602 towards the away supporters in the away stand 100a.

The methods described herein relate to increasing the amount of glare the spectator 150 experiences within range 602, as this is the range in which the spectator's unwanted behavior is assumed to be directed. Hence, range 602 may be reduced in cases where it is possible to determine a more precise location of a target of the unwanted behavior.

Range 601 represents directions in which the spectator 150 can view the event and therefore glare should preferably not be generated within this range. Hence, it may be preferable to mount the luminaires 101 towards or on (as shown in FIG. 3) the ceiling/roof of the stand.

Note that the above has been described with reference to a single spectator 150, but applies equally to a group of spectators. In these cases, an overall range of directions (lines of sight) for the group of spectators towards the stand 100a (or, where possible, subsection thereof) can be used as range 602, i.e. the range in which the amount of glare is to be increased.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling at least one light source to generate glare towards at least one spectator area in a stadium comprising a plurality of spectator areas, the method comprising:
   receiving, from a sound transducer in the stadium, an audio signal,
   analyzing, by a processor, the audio signal to recognize a specific sound or sound pattern indicative of unwanted behavior,
   detecting, by the processor, based on said analysis, that at least one spectator is exhibiting unwanted behavior within a first spectator area;
   determining, by a source localization module, a location of the first spectator area;
   identifying, by the processor, a second spectator area as being a target of the unwanted behavior,
   determining, by the processor, a line of sight between the first spectator area and the second spectator area; and
   controlling at least one light source to increase an amount of glare along the determined line of sight thereby discouraging the at least one spectator from looking towards the second spectator area to discourage the unwanted behavior.

2. The method of claim 1, wherein the at least one light source comprises fixed optics for generating glare and said increasing the amount of glare comprises activating the at least one light source.

3. The method of any of claim 1, wherein the at least one light source comprises variable optics and said increasing the amount of glare comprises controlling the optics of the at least one light source such that the amount of glare increases.

4. The method of claim 1, wherein the at least one light source is controlled to increase the amount of glare along the line of sight from a deBoer rating of more than five to a deBoer rating of five or less.

5. The method of claim 1, wherein increasing the amount of glare comprises increasing an amount of discomfort glare along the line of sight.

6. The method of claim 1, wherein increasing the amount of glare comprises increasing an amount of disability glare along the line of sight.

7. The method of claim 1, further comprising receiving sensor input from at least one photosensor and determine, based on the sensor input, a background light level; and wherein the at least one light source is controlled to increase the amount of glare based on the determined background light level.

8. The method of claim 1, wherein the at least one light source is at least one spotlight.

9. The method of claim 1, wherein the at least one light source is at least one pivotable light source; and the method further comprising pivoting the light source to illuminate the spectator.

10. The method of claim 1, wherein the at least one light source is at least one moveable light source; and the method further comprising moving the light source to illuminate the spectator.

11. The method of claim 1, wherein the at least one light source is selected from a plurality of light sources based on the determined locations.

12. The method of claim 1, wherein the at least one light source is controlled to change a direction of light emission based on the determined locations.

13. A controller of a lighting system, comprising at least one light source, for generating glare towards at least one spectator area in a stadium comprising a plurality of spectator areas, the controller comprising at least one processor and configured to carry out the method of claim 1.

14. A lighting control system for generating glare towards at least one spectator area in a stadium comprising a plurality of spectator areas, the lighting control system comprising: at least one light source; at least one sound transducer in the stadium; and a controller configured to:
   receive, from a sound transducer in the stadium, an audio signal,
   analyze the audio signal to recognize a specific sound or sound pattern indicative of unwanted behavior
   detect, based on said analysis, that at least one spectator is exhibiting unwanted behavior within a first spectator area;
   determine a location of the first spectator area;
   identify a second one of the spectator areas as being a target of the unwanted behavior;
   determine a line of sight between the first spectator area and the second spectator area; and
   control the at least one light source to increase an amount of glare along the determined line of sight thereby discouraging the at least one spectator from looking towards the second spectator area to discourage the unwanted behavior.

15. A computer program product comprising computer-executable code embodied on a computer-readable storage medium configured, so as when executed by at least one processor, to perform the steps of the method according to claim 1.

* * * * *